G. B. Field,
Coffin.
N° 30,874. Patented Dec. 11, 1860.

Witnesses:
John S. Hollingshead
W. S. Clary

Inventor:
Geog B Field

UNITED STATES PATENT OFFICE.

GEORGE B. FIELD, OF ST. LOUIS, MISSOURI.

GLASS COFFIN.

Specification of Letters Patent No. 30,874, dated December 11, 1860.

*To all whom it may concern:*

Be it known that I, GEORGE B. FIELD, of the city and county of St. Louis and State of Missouri, have invented a new and useful Improvement in the Construction of Glass Coffins, which I call " Field's Improved Glass Coffin; " and I do hereby declare that the following is a full and clear description of the construction of the same, reference being had to the annexed drawings, making a part of this specification, in which—

Figure 1:
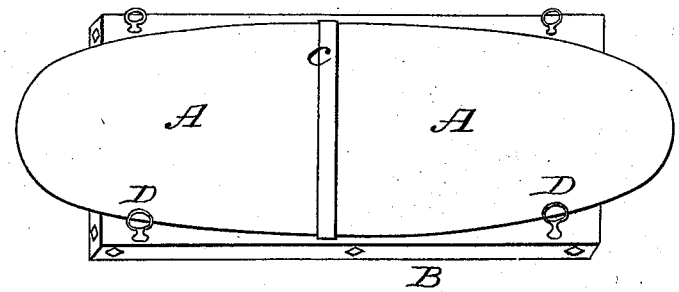
Figure 2:
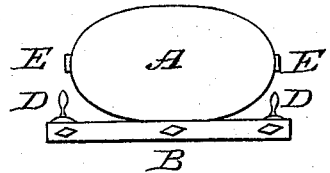
Figure 3:
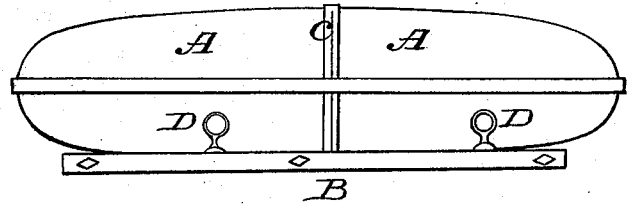

Figure 1 is a perspective view; Fig. 2 a transverse section, and Fig. 3 a longitudinal elevation.

Letters A A are transverse sections or cylinders of glass which are to be blown into the desired shape for use. These are joined together by the elastic band, C, and held in their proper places by the band E or any other equivalent force operating in a longitudinal direction. The coffin is opened transversely or crosswise. After the coffin is closed and the elastic band drawn around so as to cover the seam I draw an additional metallic strap over the elastic band for the purpose of giving additional strength to the whole. The coffin so arranged is placed on the platform B for the safety and convenience of handling, the said platform to be used as a permanent attachment designed to be buried with the coffin. In drawing the elastic band around the coffin I do so with a considerable degree of tension, so that when it laps over on to each section, the portion which covers the seam shall sag in toward the interior of the coffin and between the glass sections for the purpose of preventing the sections from coming in violent contact.

With regard to the plan or process of manufacturing glass coffins by the blowing process instead of casting in pressure molds they are blown in the usual manner of glass blowing either first into separate, transverse, cylindrical sections, and afterward joining the several sections together, so as to compose the coffin, or by blowing the whole coffin entire in one piece and afterward cutting or dividing the piece so as to admit the introduction of the corpse.

What I claim as my invention and desire to secure by Letters Patent is—

The article of manufacture, viz a coffin made of blown glass, composed of two or more pieces, in the manner substantially as described.

GEORGE B. FIELD.

Attest:
 JOHN S. HOLLINGSHEAD,
 W. S. CLARY.